United States Patent [19]

Kamimura et al.

[11] Patent Number: 5,426,584
[45] Date of Patent: Jun. 20, 1995

[54] STEERING CONTROL SYSTEM FOR MOVING VEHICLE

[75] Inventors: Kenji Kamimura; Sadachika Tsuzuki; Toshikazu Nakamura, all of Saitama, Japan

[73] Assignee: Honda Giken Kogyo Kabushiki Kaisha, Tokyo, Japan

[21] Appl. No.: 15,121

[22] Filed: Feb. 9, 1993

[30] Foreign Application Priority Data

Feb. 24, 1992 [JP] Japan .................................. 4-072189

[51] Int. Cl.6 .......................................... G01C 21/20
[52] U.S. Cl. ............................... 364/424.02; 180/169; 250/561; 356/152.3
[58] Field of Search .................. 250/561; 364/424.02, 364/449; 362/37; 180/169; 356/152.3

[56] References Cited

U.S. PATENT DOCUMENTS

| | | | |
|---|---|---|---|
| 4,947,324 | 8/1990 | Kamimura et al. | 364/424.02 |
| 5,008,557 | 4/1991 | Noji et al. | 250/561 |
| 5,014,204 | 5/1991 | Kamimura et al. | 364/449 |
| 5,019,990 | 5/1991 | Kamimura et al. | 364/449 |
| 5,025,377 | 6/1991 | Kamimura et al. | 364/424.02 |
| 5,031,101 | 7/1991 | Kamimura et al. | 364/424.02 |
| 5,031,103 | 7/1991 | Kamimura et al. | 364/449 |
| 5,187,662 | 2/1993 | Kamimura et al. | 364/424.02 |
| 5,187,663 | 2/1993 | Kamimura et al. | 364/424.02 |
| 5,251,133 | 10/1993 | Kamimura et al. | 364/424.02 |
| 5,264,709 | 11/1993 | Kamimura et al. | 250/561 |

*Primary Examiner*—Kevin J. Teska
*Assistant Examiner*—Russell W. Frejd
*Attorney, Agent, or Firm*—Pollock, VandeSande and Priddy

[57] ABSTRACT

In a steering control system for a moving body in which azimuths of reference points are detected by rotatively scanning a light beam around the moving body, a current position of the moving body is calculated based on the azimuths of reference points, and the moving body is steered so that the current position thereof follows a predetermined travelling course that is calculated in accordance with an algorithm previously stored in a memory. The system assigns each detected reference point to each reference point in said algorithm for calculating the relative traveling course, based on one of a reference point that is detected first under the condition that the azimuth exceeds a first predetermined angle, and a reference point that is detected last with the azimuth being less than a second predetermined angle when the azimuth is measured with respect to the advance direction of the moving vehicle initially placed in the traveling area before the start of a work. A traveling course is set according to said algorithm using the positional information on the assigned reference points.

9 Claims, 10 Drawing Sheets

STEERING CONTROL SYSTEM FOR MOVING VEHICLE

BACKGROUND OF THE INVENTION

1. Field of the Invention

The present invention is related to a steering control system for a moving vehicle, and particularly to a steering control system for various moving vehicles such as mobile machines used for agricultural and civil engineering works, and automatic transporters used in a factory.

2. Description of the Prior Art

A control system is known in which, by causing a moving vehicle to travel in an area for a work (hereinafter referred to as a work area), a predetermined work is done by the working machine equipped on the moving vehicle. In this system, the location of the moving vehicle in the work area is detected and detected positional data is compared with a preset traveling course. Based on the comparison result, the moving vehicle is steered to correct the difference between the current position of the moving vehicle and the traveling course. This control system requires means for detecting the current position of the moving vehicle.

As the means for detecting the current position of a moving vehicle, for instance, there is an apparatus proposed in the Japanese Patent Kokai Publication No. 59-67476 official gazette. This apparatus has means for circularly scanning a light beam around the moving vehicle, and light receiver means. The light beam is projected from the moving vehicle to light reflector means placed at at least three reference positions apart from the moving vehicle. The light reflector means reflect light to the direction of incidence, and the reflected light beam is detected by the light receiver means. Based on the light beam detection signal, the differential azimuths between the respective light reflector means as viewed from the moving vehicle are detected, and the position of the moving vehicle is calculated based on the differential azimuths and the positional information of the light receiver means or the reference points.

However, to make the moving vehicle travel to perform a predetermined work, a traveling course must be first set in a work area. For instance, in the conventional control systems described in Roti et al. U.S. Pat. No. 5,011,288 and the Japanese Patent Kokai Publication No. 2-19293 official gazette, a traveling course is set so that the traveling course comprises a plurality of straight courses which are set perpendicular to the straight line connecting particular to of the plural reference points provided around a work area, and turn courses for moving from one of the straight courses to an adjacent straight course. The control system controls the moving vehicle to travel along the predetermined traveling course. That is, the direction of the straight courses set in the work area is preset by the operator on the basis of the straight line connecting the particular to reference points, and the direction of the moving vehicle is set in conformity with the direction of the preset course.

Also, in the Japanese Patent Kokai Publication No. 64-82206 official gazette, a system for controlling the traveling of an unmanned moving vehicle is described in which the teaching of a work area including reference points is performed or a work start position or traveling course is set each time the work area is changed.

The conventional control systems had the following problems.

The work area in which the moving vehicle travels takes various shapes according to the work to be done, and there are few work area with simple shapes. In the automatic traveling system of this type the traveling extent and traveling course can freely be set or changed according to the size or shape of the work area, and it is required to perform the teaching of the work area including reference points on which the traveling is based, or the setting of a work start position or traveling course each time the work area is changed.

In the control systems described in the above U.S. Pat. No. 5,011,288 and Japanese Patent Kokai Publication No. 2-19293 official gazette, each time the work area is changed, the operator needs to first input the extent, reference points and traveling course, and this is a very cumbersome work.

A proposal for improving such cumbersome work is described, for instance, in the Japanese Patent Kokai Publication No. 64-82206 official gazette, but a portable keyboard input system including a monitor and the like, or a portable handwriting-recognition system is required for teaching. The keyboard input system has a problem that operator training is not easy and not everybody can easily handle it. In the handwriting-recognition system, enough accuracy cannot be obtained if a wide work area is indicated on a small piece of paper or pad, and thus the portable handwriting-recognition system needs very high accuracy. As a result, there is a problem that the traveling control system has a large-scale configuration and it is difficult to automatize the work with a simple operation.

If the system is constructed so that a light beam is rotatively scanned in one direction to detect the reference points in a predetermined sequence, and if a calculation algorithm that sets, on this assumption, a relative traveling course with respect to the individual reference points on a two-dimensional coordinate system is pre-stored, the sequence of the reference points detection at a work area should coincide with the predetermined sequence. However, the reference point to be detected first (at a smallest azimuth) varies depending on the shape in which the reference points are arranged, and the advance direction of the moving vehicle when the operation of detecting reference points starts. To decide to which reference point in the calculation algorithm which reference point detected at the work side should be assigned, thereby to fulfill the condition that the detection sequence at a work area coincides with the predetermined sequence of the reference points, the operator must confirm the positions of the reference points by eye measurement before the operation starts, and cause the advance direction of the moving vehicle to match the direction that fulfills the above condition. It is very troublesome for the operator to set the moving vehicle in the work area while performing such adjustment for each operation start.

SUMMARY OF THE INVENTION

It is the object of the present invention to provide a steering control system for a moving vehicle wherein, even if the operator only sets the moving vehicle at a travel start position and in an advance direction with a rough feeling of direction, a traveling course enabling effective traveling can automatically be selected on the basis of the advance direction which is set, and the moving vehicle can be made to travel in the work area along the selected course.

In the present invention, the placement or detection sequence of the reference points is judged on the basis of the azimuths of reference points that are detected when the moving vehicle is first placed in the work area, and according to the judgment result, the individual reference points in the current work area can be identified by assigning them to the reference points in a traveling course calculation algorithm prepared beforehand. Thus, even if the shape of the reference points arrangement or the work area shape is not fixed, an accurate steering control is available independently of the advance direction of the moving vehicle placed in the work area.

DETAILED DESCRIPTION OF THE PREFERRED EMBODIMENT

Figure 2:
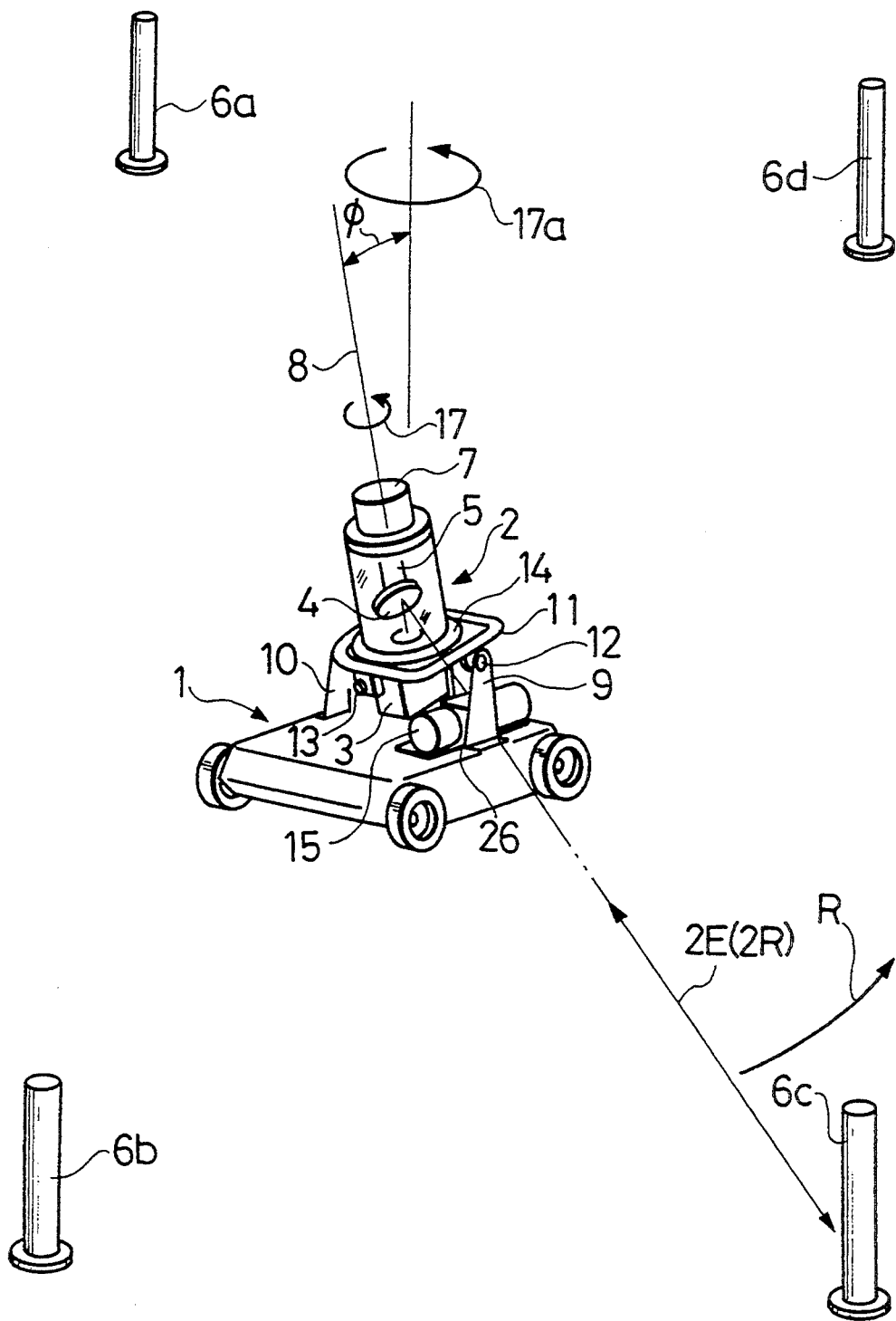
FIG. 2 is a perspective view showing the traveling state of a moving vehicle.

Now, an embodiment of the present invention is described with reference to the drawing. FIG. 2 is a view showing the embodiment of the present invention, a perspective view of a moving vehicle traveling in a work area. Light reflectors 6a–6d are placed along substantially the outer perimeter of the work area in which a moving vehicle 1 is caused to travel to perform a predetermined work. Well-known retroreflector means such as a corner cube prism is used as the reflecting surface of each reflectors 6a–6d, and the light incident upon the reflecting surface is reflected to the direction of incidence.

Moving vehicle 1 is, for instance, a lawn mower having a cutter blade for lawn mowing (not shown) on the underside of it. Light beam scanner 2 is mounted on the top of moving vehicle 1. Scanner 2 has a light emitter (not shown) for emitting light beam 2E, and a light receiver (not shown) for receiving reflected light 2R reflected at reflectors 6a–6d. For instance, the light emitter may be a light emitting diode, and the light receiver may be a photo diode, and they are mounted in a casing 3.

The light beam emanating from the light emitter is perpendicularly reflected at a mirror 4 to make a change of direction, and projected out of the scanner 2. Mirror 4 is rotated by motor 5 around central axis of rotation 8 as shown by an arrow 17a, and as a result, light beam 2E is scanned in the direction indicated by an arrow R. The direction in which light beam 2E is projected, which is represented by the rotational position of mirror 4, is detected according to the output signal of encoder 7 coupled to motor 5.

Scanner 2 is supported on moving vehicle 1 by a gimbal-type precession mechanism. The precession mechanism has an outer ring member (hereinafter simply referred to as outer ring) 11 and an inner ring member (hereinafter referred to as inner ring) 14. Outer ring 11 is journaled for oscillation with respect to brackets 9 and 10 by shaft 12 and another shaft, not shown, which is provided at the position opposed to the shaft 12. On the other hand, inner ring 14 is journaled for oscillation with respect to outer ring 11 by shaft 13 and another shaft, not shown, which is provided at the position opposed to the shaft 13. The central axes of oscillation of outer ring 11 and inner ring 14 are right-angled with each other.

The gimbal-type precession mechanism is driven by motor 15. Scanner 2 is attached to the gimbal-type precession mechanism with the central axis of rotation 8 of mirror 4 being inclined by an angle $\phi$ from the vertical, and the inclination direction continuously varies as the gimbal-type precession mechanism is driven by the motor 15. That is, scanner 2 rotates in the direction of arrow 17a. As scanner 2 rotates, central axis of rotation 8 draws a conical surface. By the precession of scanner as described above, light beam 2E is rotatively scanned around central axis of rotation 8 while the projection angle of the light beam or the angle from the horizontal continuously varies, whereby the light beam is also continuously oscillatorily scanned in the upward and downward directions. In the present embodiment, the light beam is scanned a plurality of times during the time that the central axis of rotation 8 draws a single conical surface in one cycle of precession.

Figure 3:
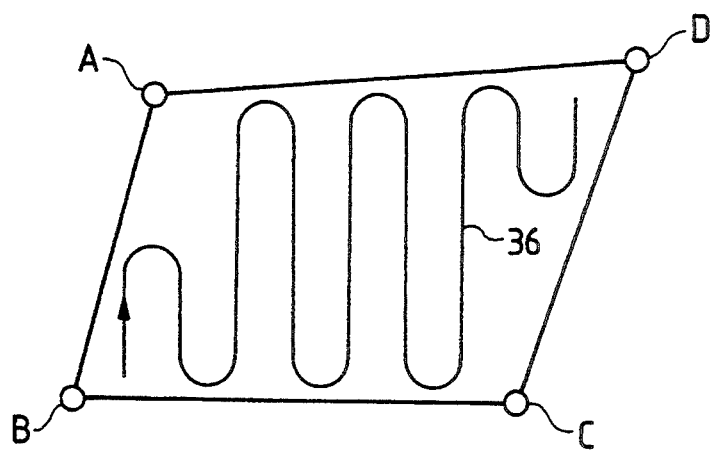
FIG. 3 is an illustration of a work area showing an example of straight courses perpendicular to the reference line.
Figure 4:
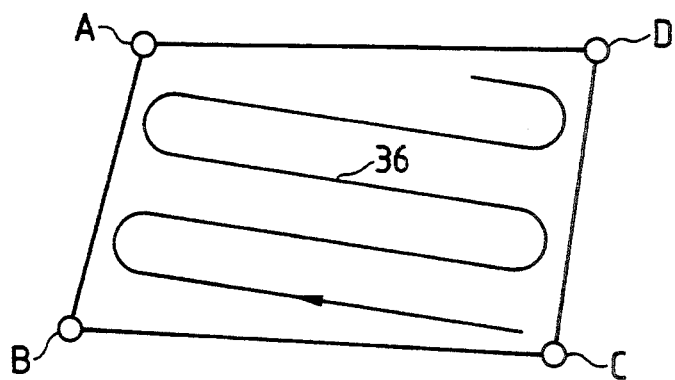
FIG. 4 is an illustration of a work area showing another example of straight courses perpendicular to the reference line.
Figure 5:
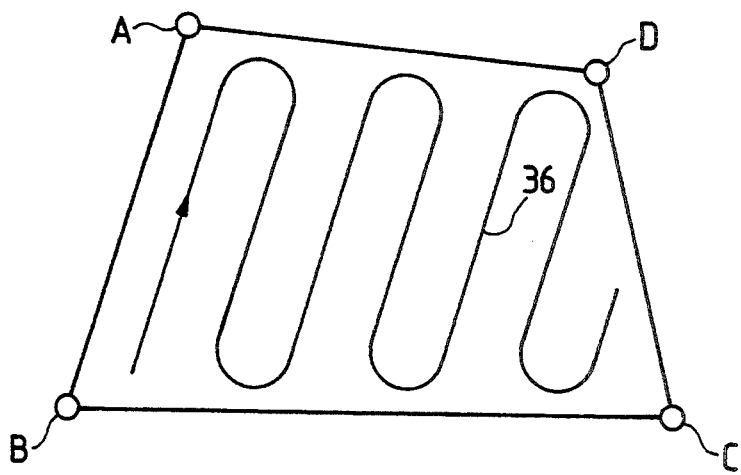
FIG. 5 is an illustration of the work area showing an example of straight courses parallel to the reference line.

Now, the method for setting the traveling course of moving vehicle 1 is outlined. FIGS. 3 to 5 are illustrations each showing an example of a traveling course set in a work area. In FIGS. 3 to 5, the work area is defined by reference points A–D. The reflectors 6a–Gd are respectively placed at the respective reference points A–D. In this embodiment, when moving vehicle 1 is set in the work area and made to perform a necessary work, flexibility can be provided to the advance direction of the moving vehicle 1 placed in the work area. That is, depending on the setting of the advance direction of the moving vehicle 1 or the straight-traveling direction of moving vehicle 1 when the vehicle 1 is set in the work area, traveling courses different from each other as shown in Pigs. 3 to 5 are established according to a predetermined rule.

To set a traveling course, one of the outlines AB, BC, CD and DA connecting the adjacent reference points to define a work area, which is intersected by a virtual line forming a predetermined angle with the advance direction of the initially set moving vehicle 1, is selected as a reference line. Based on the selection, various traveling courses 36 relative to the individual reference points as shown in FIGS. 3–5 are set. The algorithm or program for setting the relative traveling courses is prepared and stored in a memory in advance. In this embodiment, it is assumed that, based on the empirical law that the moving vehicle 1 is initially set in a work area, near a reference point with an advance direction in order to enable setting of relatively long straight courses when the work is started, a program is stored in advance for setting; a plurality of nearly parallel traveling course, s on a two-dimensional coordinate system, which has the reference point nearest to moving vehicle 1 as the origin and has the line connecting the origin to another reference point as the x-or y-axis.

If the straight courses are set perpendicular to a reference line, the outlining straight line intersected by a virtual line forming an angle of 180° with the advance direction of moving vehicle 1 is chosen as the reference line and traveling course 36 as shown in FIG. 3 or 4 is set. If the straight courses are set in parallel with the reference line, on the other hand, the outlining straight line intersected by a virtual line forming an angle of 90° with the advance direction is chosen as the reference line and traveling course 36 as shown in FIG. 5 is set.

FIG. 3 is an example in which line BC is selected as the reference line and the straight courses are set perpendicular to the reference line BC, and FIG. 4 is an example in which line CD is selected as the reference line and the straight courses are set perpendicular to the reference line CD. FIG. 5 is an example in which line AB is selected as the reference line and the straight courses are set parallel with the reference line AB.

Traveling course 36 is desirably set so that it does not run over the work area. For this purpose, in this embodiment, a limit line is set inside contour lines connecting the respective reference points A–D and at a predetermined distance from the contour lines, and turn courses for moving from one straight course to another straight course are set within the region between the limit line and the contour lines.

Figure 6:
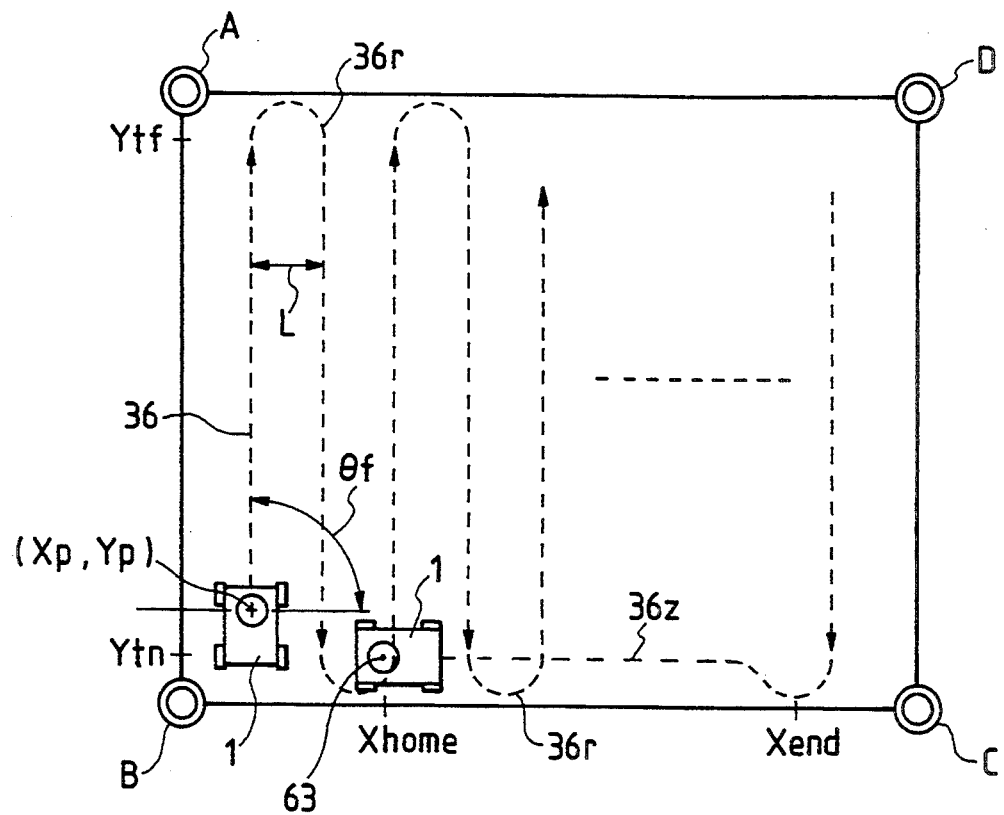
FIG. 6 is an illustration showing an arrangement of a traveling course and reflectors.

An example of the steering control of moving vehicle 1 is described below. FIG. 6 is an illustration showing the positional relationship between moving vehicle 1 and reference points A–D, and moving vehicle 1 travels along the traveling course 36 set in the work area to perform a predetermined work such as lawn mowing. Prior to the work, the positions of reference points A–D are firstly detected by the process of a flowchart described in detail later, and those positions are input to the control system of moving vehicle 1.

The light beam circularly scanned by scanner 2 around moving vehicle 1 is reflected by the reflectors at reference points A–D, and when the reflected light is detected, the incident angle (azimuth) of the reflected light is detected based on the output signal of the encoder 7. In the control system, the position of moving vehicle 1 is calculated on the basis of the azimuths and the positional information (coordinates) of reference points A–D. The current position and traveling course 36 are compared, and the steering angle of the moving vehicle 1 is controlled to cancel the difference between them, or deviation of the current position from the traveling course. Hereinafter, the current position of moving vehicle 1 is represented by coordinate values $(X_p, Y_p)$, and the advance direction of moving vehicle 1 is represented by angle $\theta f$ on the basis of the x-coordinate axis, or line BC in the example shown in FIG. 6.

When moving vehicle 1 is first set near reference point B, it travels the traveling course 36 which is set by the prestored traveling course setting algorithm according to the setting direction of the moving vehicle 1, and returns to home position 63 through final course 36z. In the example of FIG. 6, the plurality of straight courses are set perpendicular to reference line BC, and the individual straight courses are connected by turn courses 36r.

After traveling a straight course, moving vehicle 1 travels a turn course at a position at which the y-coordinate has exceeded Ytf or become smaller than Ytn, moving to the adjacent next straight course. In this embodiment, moving vehicle 1 travels a turn course with its steering angle being fixed to a constant value. If the x-coordinate of a straight course has exceeded Xend, the moving vehicle 1 returns to home position 63 via the final turn course and course 36z.

In FIG. 6, for simplicity, the work area was assumed to be rectangular and the straight courses were made parallel with the y-axis on line AB. However, as described with reference to FIGS. 3 to 5, the work area is not limited to a rectangle, and the straight traveling course 36 can be set perpendicular to, parallel with, or to form any angle with respect to any of the boundary lines connecting any two of reference points A–D.

The descriptions of principle and calculation formulas for obtaining the position of moving vehicle 1 in the above described steering control are omitted, because they are described in detail, for instance, in U.S. Pat. Nos. 5,011,288 and 4,947,324.

Figure 7A:
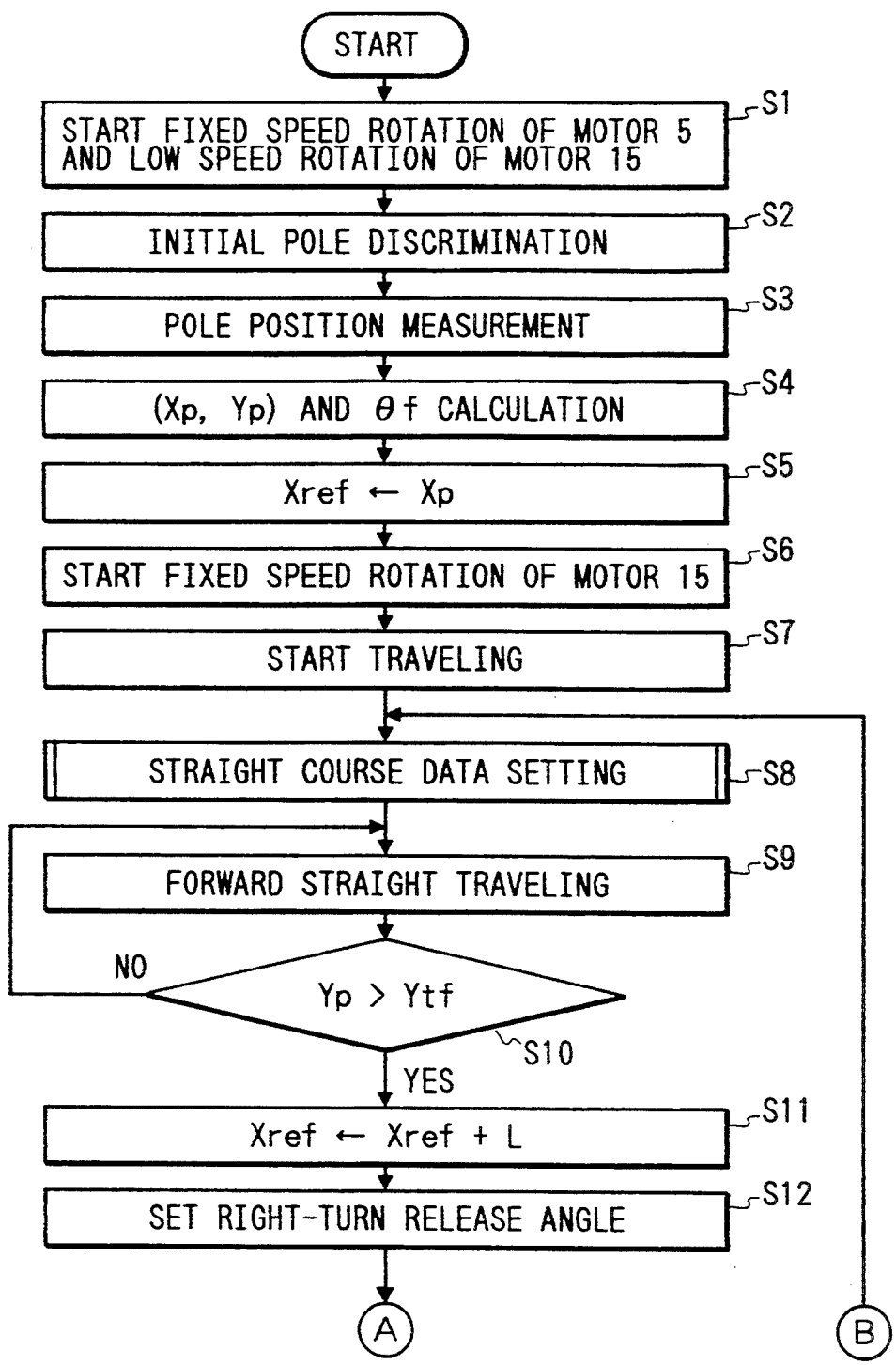
FIGS. 7A and 7B taken together are a general flowchart showing the operation of the embodiment.
Figure 7B:
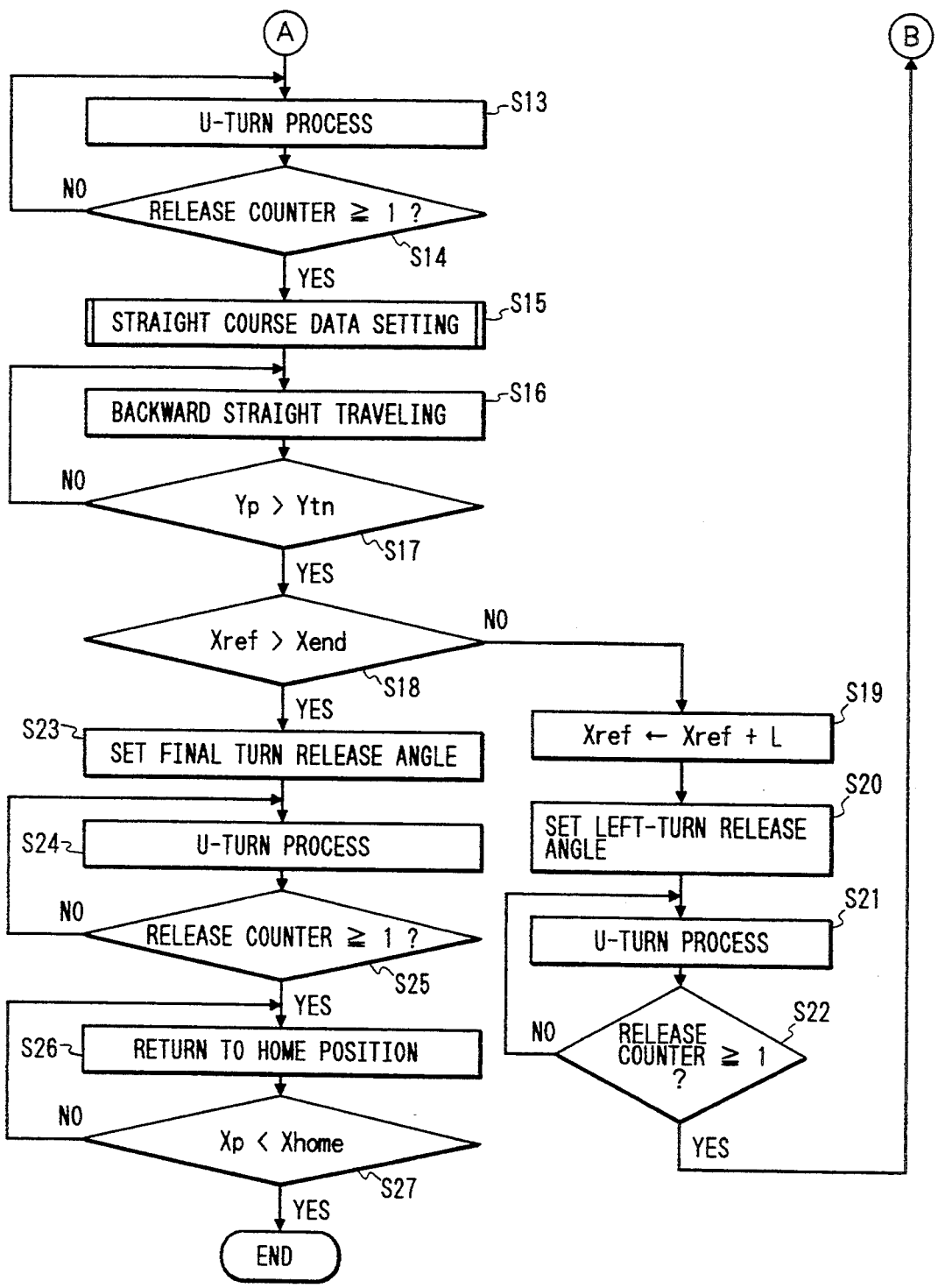

Now, referring to the flowchart of FIGS. 7A and 7B, the steering control for causing moving vehicle 1 to travel as described above is explained. In step S1, motor 5 is started up, mirror 4 is rotated around central axis of rotation 8, and motor 15 is started up to cause the central axis of rotation 8 to precess in a conic locus. As a result, light beam 2E emanating from scanner 2 is also circularly scanned while varying the angle from the horizontal (projection angle). At this stage, motor 15 is rotated at rather low speed so that the light beam can surely be applied to reflectors 6a–6d disposed at reference points A–D.

In step S2, the light reception data detected during each precession of central axis of rotation 8 is analyzed, and a discrimination process of reflectors 6a–6d disposed at the reference points, or an initial pole discrimination process is performed. The initial pole discrimination process will be described in detail later with reference to FIGS. 13, 14 and 15.

In step S3, a pole position measuring process is performed. in which each distance from moving vehicle 1 to each reference point A–D is measured to calculate the position of each reference point. The pole position measuring process is implemented as follows, for instance. Each distance to reference points A–D from the vehicle 1 is measured on the basis of the respective height (known value) of reflectors 6a–6d, and on the values representing the maximum and minimum inclination angles of central axis of rotation 8 when the lights reflected by each reflector are detected a plurality of times. The positions (coordinate values) of the reference points are calculated on the basis of the distances and the azimuths of the reference points obtained by the initial pole process. The pole position measuring process is described in more detail in Nakamura et al. U.S.

Pat. No. 5,260,770 issued Nov. 9, 1993 for "System For Detecting the Position of Observation Spot.

In step S4, on the basis of the azimuths of the reference points calculated in step S2 and the coordinate values of the reference points calculated in step S3. the current positional coordinates (Xp, Yp) and advance direction $\theta f$ of moving vehicle 1 are calculated.

In step S5, the current x-coordinate Xp of moving vehicle 1 is set as the x-coordinate Xrcf of the first straight course.

In step S6, motors 5 and 15 are rotated at a predetermined high speed to rotate and oscillate mirror 4. In step S7, The revolution of the engine of moving vehicle 1 is coupled to the driving wheels to start the traveling thereof.

In step S8. in order to prevent moving vehicle 1 from overrunning from the work area, a straight course data setting process is performed for setting the length of the straight courses, or the upper limit value Ytf and the lower limit value Ytn of the y-coordinate, according to the shape of the work area. The detail of this process is described later with respect to FIG. 10.

In step S9, a forward straight traveling process is performed for causing moving vehicle 1 to travel straight in the direction in which the y-coordinate value increases. In this process, the current position (Xp, Yp) and advance direction $\theta f$ of moving vehicle 1 are calculated on the basis of directions of incidence (azimuths) of lights reflected by the reflectors. In addition, the difference between the calculated value and the set traveling course is calculated, and the steering control is used to correct the difference.

In step S10, according to whether or not the current y-coordinate Yp of moving vehicle 1 has exceeded its upper limit value Ytf, it is judged whether or not the moving vehicle 1 has completed the traveling of the forward straight course. If the judgment is positive. the process goes to step S11, where distance L (the distance between adjacent two straight courses) is added to the x-coordinate Xref of the straight course to set the next straight course.

In step S12, a predetermined azimuth data is set as the right-turn release angle for determining the time when the traveling of the turn course following the straight course should be terminated, thereby to prepare for the following U-turn process. In step S13, a U-turn process is performed to make a right turn with a fixed turning radius, and with the steering angle being fixed to a predetermined value.

In step S14, it is judged whether or not the time for terminating the turn of moving vehicle 1 has been reached. For this, the number of reference points for which the azimuth viewed from moving vehicle 1 has reached the right-turn release angle is counted by a release counter in the U-turn process. In the present embodiment, according to whether or not tile release counter value has been "1" or more, it is determined whether or not the turning of the vehicle 1 should be terminated. That is, the time at which the azimuth of at least one of the reference points has reached the right-turn release angle is used as the criterion for judging the timing of finishing the turning.

If the judgment in step S14 is positive, the process moves to step S15, judging that the traveling of the turn course has been completed. In step S15, a straight traveling course data setting process is performed for the next straight course. In step S16, a backward straight traveling process is performed for causing moving vehicle 1 to travel straight in the direction in which the y-coordinate value decreases.

In step S17, according to whether or not the y-coordinate of moving vehicle 1 has become smaller than the lower limit value Ytn of the y-coordinate, it is judged whether or not the traveling of the backward straight course has been completed. If the judgment is positive, the process flows to step S18, where it is judged whether or not Xref of the straight course has exceeded the x-coordinate Xend of the point at which the work is expected to terminate. If the judgment in step S18 is negative, step S19 is entered to set the next straight course.

In step S20, a left-turn release angle setting process is performed for setting the time when a left turn should be terminated. In step S21. a U-turn process is performed, and in step S22, it is judged whether or not the release counter value has been "1" or more. If the judgment is positive, the process skips to step S8, judging that the traveling of the turn course has been completed.

On the other hand, the traveling of all the straight courses must be completed before the judgment in step S18 can become positive, and then the process advances to step S23 to set the release angle in the final turn course. This is similar to the setting of the right-turn release angle or left-turn release angle.

In step S24, a U-turn process is done. and in step S25, it is judged whether or not the release counter value has been "1" or more. In step S26, moving vehicle 1 is caused to travel the straight course to return to home position 63.

In step S27, it is judged whether or not the x-coordinate Xp of moving vehicle 1 has been equal to, or smaller than the x-coordinate Xhome of home position 63, and if the judgment is positive, it is judged that moving vehicle 1 has returned to home position 63, completing the process.

The need for the initial pole discrimination process, a main portion of the present invention, is now described. As described above, a traveling course is determined on the basis of the positional information (coordinates) of the reference points on a two-dimensional coordinate system, and the calculation program or algorithm for that is prestored in an appropriate memory. Actually, each reference point detected at a work site must be made to correspond to each reference point assigned in the calculation program. If the reference points detected at the work site are not made to properly correspond to the individual reference points assigned in the calculation program, the calculated traveling courses will be different from ones which the operator expects and the work cannot be performed as desired. More specifically, for simplifying the calculation, it is assumed in the present embodiment that a program is prestored for setting a traveling course on a two-dimensional coordinate system the origin of which is one reference point relatively near to the initially set moving vehicle and the x-axis of which is the straight line connecting the origin to one other reference point adjacent thereto. Consequently, it is self-evident that, if the calculation is based on an origin or coordinate axis having a condition different from the above assumption at an actual work site, a traveling course different from the intended one and proper steering control is not provided. The initial pole discrimination process is useful for successfully determining to which reference point in the traveling course setting program or algorithm a reference point detected at the work site is to be assigned.

Figure 13:
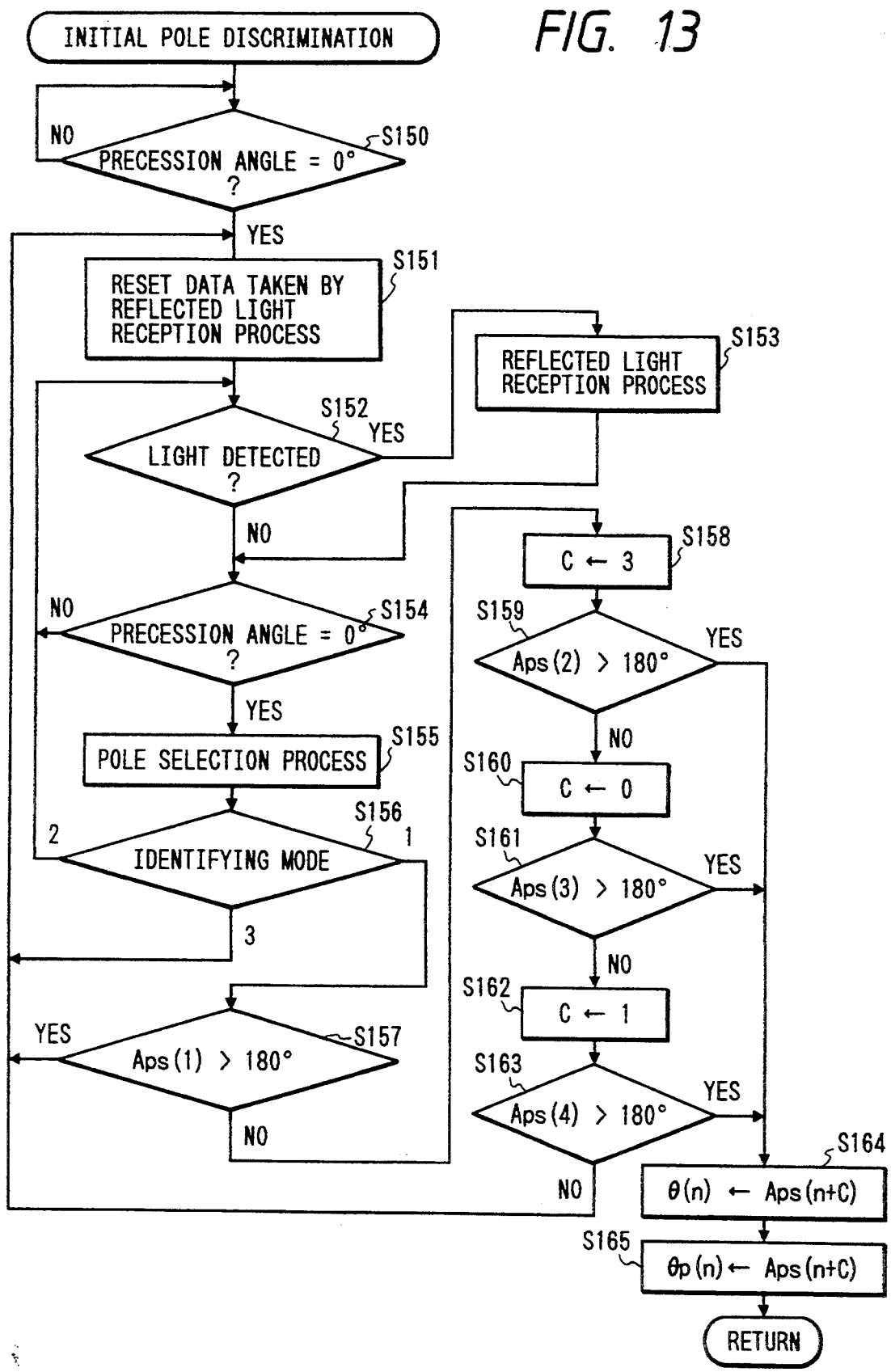
FIG. 13 is a flowchart showing an initial pole discrimination process.
Figure 14:
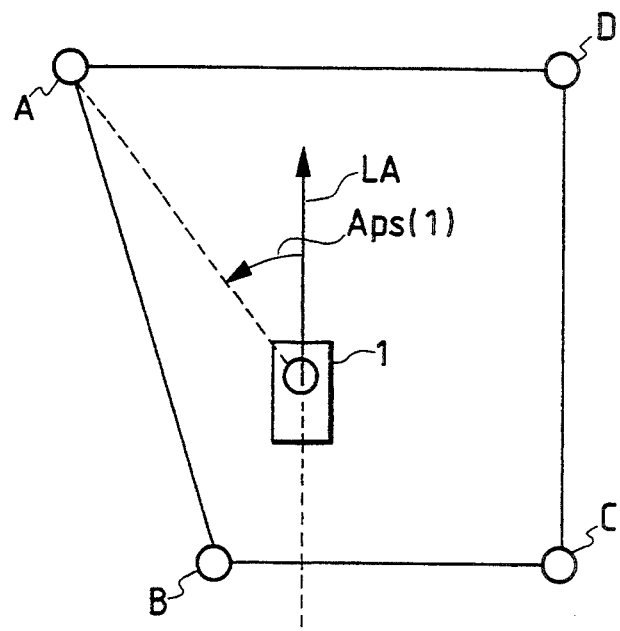
FIGS. 14 and 15 are illustrations showing the concept of initial pole discrimination, respectively.
Figure 15:
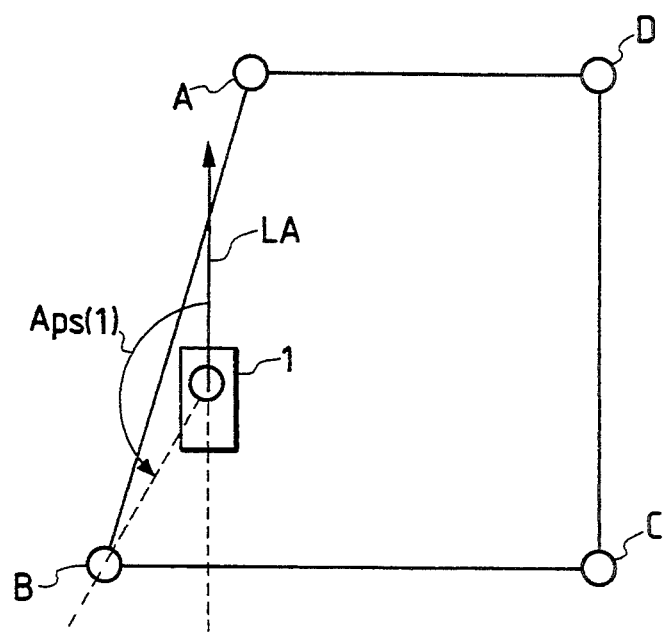

Referring to the flowchart of FIG. 13 and the arrangement representations of FIGS. 14 and 15, the details of the initial pole discrimination process in the step S2 is described. It is assumed that the moving vehicle 1 is initially so placed that with the outlining straight line BC connecting reference points B and C being used as a reference line, a virtual line extended in the direction opposite to (making an angle of 180° with) the advance (forward) direction LA of moving vehicle 1 intersects the line BC, and the advance direction is set to point toward the side on which the remaining reference point A and D are existing, as shown in these figures. Even if moving vehicle 1 is initially so placed in the work area, when the work area shapes or the reference points arrangement. shapes differ from each other as shown in FIGS. 14 and 15, the reference points to be detected first after the start of the operation for detecting reference points depends on each arrangement. That is, if a light beam is rotatively scanned in a counterclockwise direction on the basis of the advance direction LA of moving vehicle 1, reference point A is detected first in FIG. 14 whereas point B is detected first in FIG. 15. The detection sequences of the reference points in the respective cases are A-B-C-D and B-C-D-A.

Since the reference points detection sequence varies depending on the condition such as the arrangement state of reference points or the state in which moving vehicle 1 is initially placed, accurate steering is not available when control is made without recognizing the correct sequence. Therefore, before calculation the self-position and advance direction of moving vehicle 1 for steering control, it is required to correctly recognize, in advance to which reference point in the previously prepared traveling course calculation algorithm each detected reference point corresponds. Also, it is required that, if the light from something other than an expected reflector means is detected, this light signal should not incorrectly be recognized as reflected light from the expected reflector means. For that, the initial pole discrimination process is performed.

The initial pole discrimination process serves to prevent incorrect detection of a reflected light and cause the detection sequence of reference points to coincide with a predetermined sequence. For that, in the initial pole discrimination process shown in the flowchart of FIG. 13, the reference point which is detected first after the light beam scanning by scanner 2 has advanced 180° the following start of the reference point detecting operation, is recognized to be the reference point C, that is, the reference point expected to be detected thirdly after the start of the detection operation.

In step S150, it is judged whether the precession direction is 0°, that is, whether or not the inclination direction of the central axis of rotation 8 coincides with the advance direction of moving vehicle 1, and since then, the light detection signals by the light receiver are accepted.

If the judgment in step S150 is positive, the data taken in during a reflected light reception process (S153) is reset in step S151. In step S152, it is judged whether or not light has been detected, and the process goes to step S153 to perform the reflected light reception process if light has been detected. In the reflected light reception process, when a plurality of lights have entered from substantially the same direction, these light reception data, that is, data showing a direction of incidence or an azimuth of light with respect to the advance direction of moving vehicle 1, are collectively stored as one detection block.

In each detection block, the number of the light reception data on substantially the same direction that are stored in the detection block, namely, the number of times of light receptions is stored along with the detected azimuth data. Accordingly, in the reflected light reception process, detection blocks or memory areas at least as many as the number of reference points are reserved, in which the light reception data are stored.

When the storing of light reception data has ended, or if the judgment in step S152 is negative because no light has been detected, the process flows to step S154 to determine again whether the precession direction is 0°. Light reception data are collected in the reflected light reception process until the above judgment becomes positive, or while the gimbal mechanism performs one cycle of precession and a plurality of rotative light beam scans are performed.

If the judgment in step S154 becomes positive, the process advances to step S155 where a pole selection process is performed. In the pole selection process, detection blocks in which the number of times of light receptions exceeds a predetermined number are selected, and the azimuths representing the detection blocks are set in ascending order in parameters Aps (1)–(4).

In step S156, dentfying modes are determined. The dentifying mode (1) means that the number of detection blocks in which the number of times of light receptions is greater than the predetermined number is four or equal to the number of preset reference points, the identifying mode (2) means that the number of detection blocks is less than four, and the identifying mode (3) means that the number of detection blocks is more than the number of the reference points or four.

For the identifying mode (1), the process goes to the next step S157 because four detection blocks equal in number to the reference points could be selected. For the identifying mode (2), the process returns to step S152 for further light reception data gathering because the number of light reception data is small and the four reference points cannot be identified. For the identifying mode (3), the detection operation is started again with step S151 because it is considered that light has been received from light reflecting or emitting objects other than the predetermined reflector means and the four reference points cannot be identified.

In step S157, it is judged whether or not the azimuth Aps (1) of the detection block having the smallest azimuth is greater than 180°. If the judgment is positive, the azimuths Aps (1)–(4) of all the detection blocks are greater than 180°. This means that the location of moving vehicle 1 is out of the work area or light reflecting or emitting objects other than the predetermined reflector means have been detected. Thus, the process returns to step S151 to retry the reflected light reception process from the beginning.

If the judgment in step S157 is negative, the process advances to step S158 where "3" is set in parameter C.

In step S159, it is judged whether or not the azimuth Aps (2) of the detection block having the second smallest azimuth is greater than 180 °. If the judgment is positive, the process skips to step S164. If the judgment in step S159 is negative, step S160 is entered to set "0" in parameter C.

In step S161, it is judged whether or not the azimuth Aps (3) of the detection block having the third smallest azimuth is greater than 180°. If the judgment is positive, the process skips to step S164. If the judgment in step S161 is negative, step S162 is entered to set "1" in parameter C.

In step S163, it is judged whether or not the azimuth Aps (4) of the fourth detection block having the largest azimuth is greater than 180°. If the judgment is positive, the process goes to step S164. If the judgment in step S163 is negative, the azimuths Aps (1)-(4) of all the detection blocks are smaller than 180°. This means that the location of moving vehicle 1 is out of the work area or light reflecting or emitting objects other than the predetermined reference means have been detected. Thus, the process returns to step S151 to retry the reflected light reception process from the beginning.

In step S164, detection block Aps (n+C) is set as the azimuth $\theta$ (n) of reference point n. The numbers of "1", "2", "3" and "4" are assigned to reference points A, B, C and D. respectively, as parameter n.

For instance, the judgment in step S159 is positive when the moving vehicle 1 and the arrangement of the reference points are in the relationship of FIG. 15. Accordingly, the azimuth Aps (1+3)=Aps (4) of the detection block is set as the azimuth $\theta$ (1) of reference point A (n=1). Similarly, the azimuth Aps (2+3)=Aps (5) of the detection block is set as the azimuth $\theta$ (2) of reference point B (n=2). In this embodiment, since the number of the provided reference points is "4", parameter (n+C) never exceeds "4". Therefore, if the parameter exceeds "4" as a result of the processing in step S164, "4" is subtracted from the sum (n+C).

The judgment in step S161 is positive when moving vehicle 1 and the arrangement of the reference points are in the relationship of FIG. 14. In this case, parameter C is "0" and azimuths Aps (1)-(4) are directly set as azimuths $\theta$ (1)-(4), respectively.

In step S165, detection block Aps (n+C) is set as predicted azimuth $\theta$ p (n) in which-the same reference point is to be detected in the next scan. That is, the same azimuth as the current detected azimuth is set as a predicted azimuth. By setting a predicted azimuth in this way, detection of an expected reflector means can be judged according to whether the detected azimuth in the next scan approximately matches the predicted azimuth or largely deviates from it. Also in this case, a correction operation is of course carried out so that the parameter (n+C) does not exceed "4".

Figure 10:
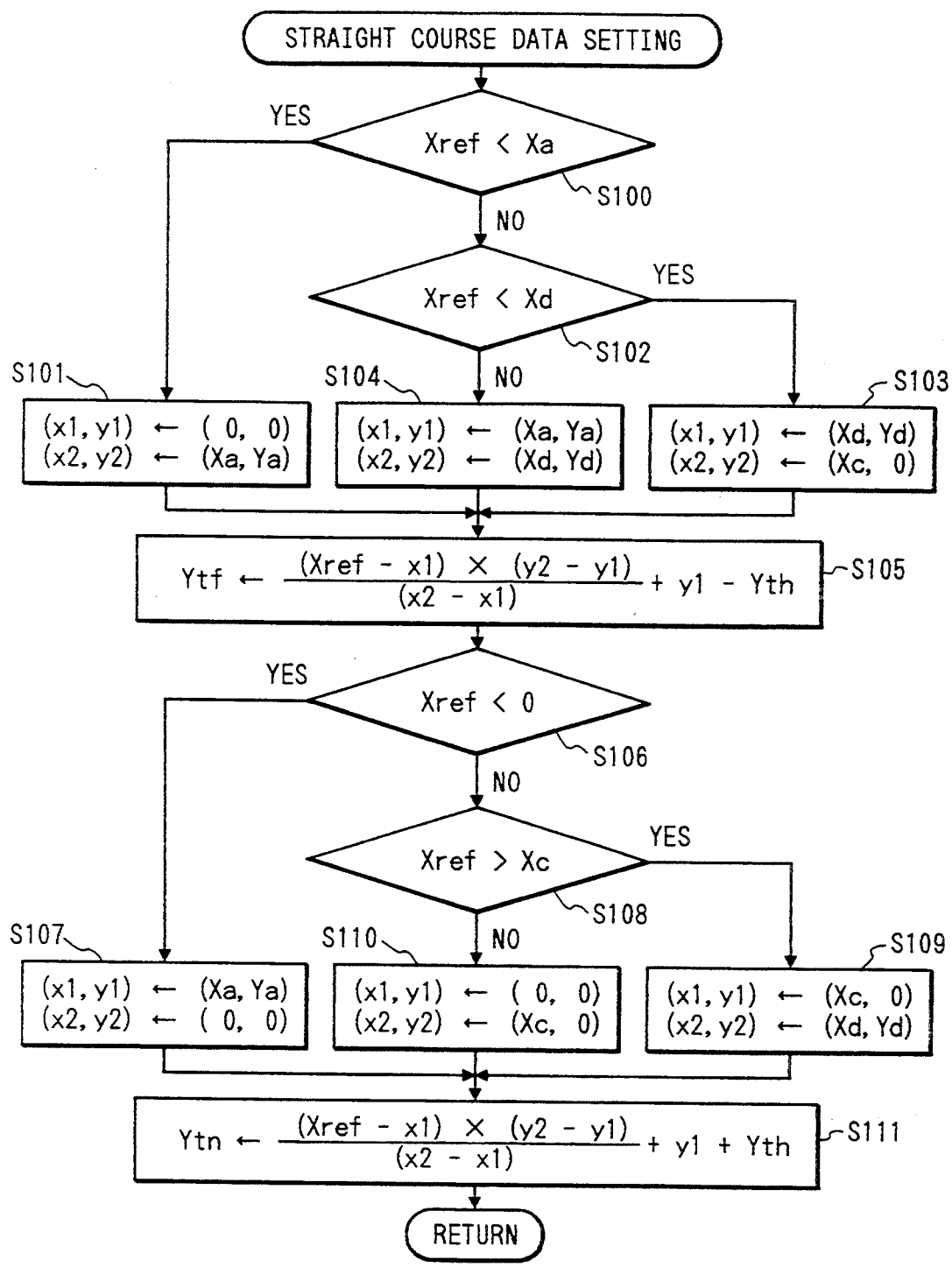
FIG. 10 is a flowchart showing a straight course setting process.

Subsequently, the straight course determining processes in steps S9 and S16 are detailed with reference to the flowchart shown in FIG. 10 and the work areas shown in FIGS. 11 and 12. In this instance, the work areas are assumed to be nearly trapezoidal, and the coordinates have their origin at the point B and the x-axis is straight line BC. Thus, instead of a rectangular work area in which there is no change in the length of the straight courses, by assuming an approximately trapezoidal area in which the length of the straight courses changes, the intention of the description is more clarified.

Figure 11:
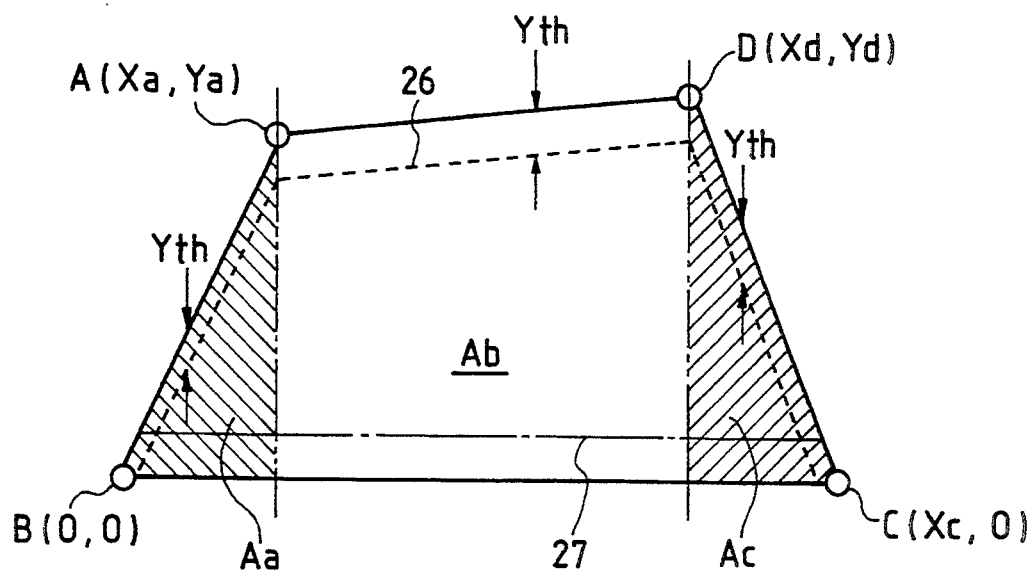
FIG. 11 is an illustration of a work area for explanation of the straight course setting process.
Figure 12:
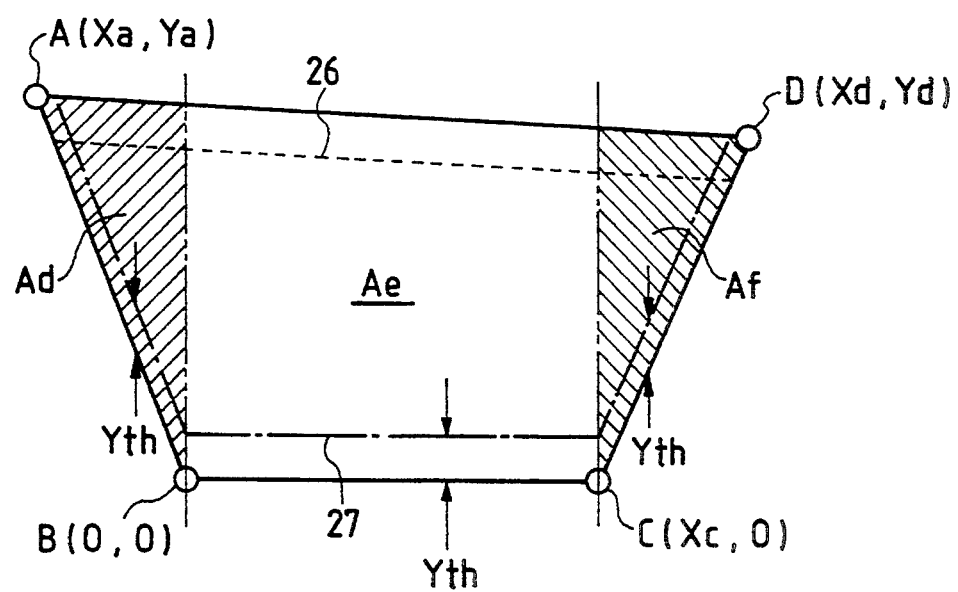
FIG. 12 is an illustration of another work area for explanation of the straight course setting process.

In FIGS. 11 and 12, dotted line 26 represents the upper limit value Ytf of the y-coordinate of straight courses that is set inside the work area at a predetermined distance Yth therefrom, and chain line 27 represents the lower limit value tn of the y-coordinate of the straight courses. Moving vehicle 1 starts a U-turn when it arrives at the dotted line 26 or chain line 27.

First, in step S100, it is judged whether or not the coordinate Xref of a straight course in question is smaller than the x-coordinate Xa of reference point A. If the judgment is positive, the process goes to step S101. The judgment in step S100 becomes positive when moving vehicle 1 exists in region Aa of FIG. 11; there is no corresponding region in the work area of FIG. 12. In step S101, the origin of coordinates or the coordinates (0, 0) of reference point B are set in variables (xl. yl), and the coordinates (Xa, a) of reference point A are set in variables (x2, y2).

On the other hand, if step S100 is negative, the process skips to step S102. In step S102, it is judged whether or not the coordinate Xref of a straight course in question is greater than the x-coordinate Xd of reference point D. If step S102 is positive, the process flows to step S103. The judgment in step S100 is negative and step S102 is positive when moving vehicle 1 exists in region Ac of FIG. 11; there is no corresponding region in the work area of FIG. 12. In step S103, the coordinates (Xd, Yd) of reference point D are set in variables (xl, Y1), and the coordinates (Xc, 0) of reference point C are set in variables (x2, y2).

If the judgment in step S102 is negative, step S104 is entered. The judgments in steps S1O0 and S102 are both negative when moving vehicle 1 exists in region Ab of FIG. 11 or anywhere in the work area of FIG. 12. In step S104, the coordinates (Xa, Ya) of reference point A are set in variables (xl, yl), and the coordinates (Xd, Yd) of reference point D are set in variables (x2, y2).

After the coordinate values have been set in steps S101, S103 or S104, the process goes to step S105, where the calculation formula shown in the figure is used to calculate the upper y-coordinate limit value Ytf of the straight courses.

Steps S106–S111 are processings to calculate the lower y-coordinate limit value tn of the straight courses. In step S106, it is judged whether or not the x-coordinate Xref of a straight course is smaller than "0". If the judgment is positive, the process moves to step S107. The judgment in step S106 becomes positive when moving vehicle 1 exists in region Ad of FIG. 12; there is no corresponding region in the work area of FIG. 11. In step S107, the coordinates (Xa, Ya) are set in variables (xl, yl), and the coordinates (0, 0) of the origin or reference point B are set in variables (x2, y2).

On the other hand, if step S106 is negative. the process flows to step S108. In step S108, it is judged whether or not the coordinate Xref of a straight course is greater than the x-coordinate Xc of reference point C. If the judgment in step S108 is positive, step S109 is entered. The judgment in step S106 is negative and step S108 is positive when moving vehicle 1 exists in region Af of FIG. 12; there is no corresponding region in the work area of FIG. 11. In step S109, the coordinates (Xc, 0) of reference point C are set in variables (xl, yl), and the coordinates (Xd, Yd) of reference point D are set in variables (x2, y2).

If the judgment in step S108 is negative. the process goes to step S110. The judgments in steps S106 and S108 are both negative when moving vehicle 1 exists in region Ae of FIG. 12 or anywhere in the work area of FIG. 11. In step S110, the coordinates (0,0) of the origin or reference point B are set in variables (xl, yl), and the coordinates (Xc, 0) are set in variables (x2, y2).

After the coordinate values have been set in steps S107, S109 and S110, the process goes to step S111, where the calculation formula shown in the figure is used to calculate the lower y-coordinate limit value Ytn of the straight courses.

The upper and lower limit coordinates Ytf and Ytn of straight courses are determined in the way mentioned above and these courses are placed at intervals of L, and a traveling course is defined by connecting the straight courses by turn courses.

Figure 1:
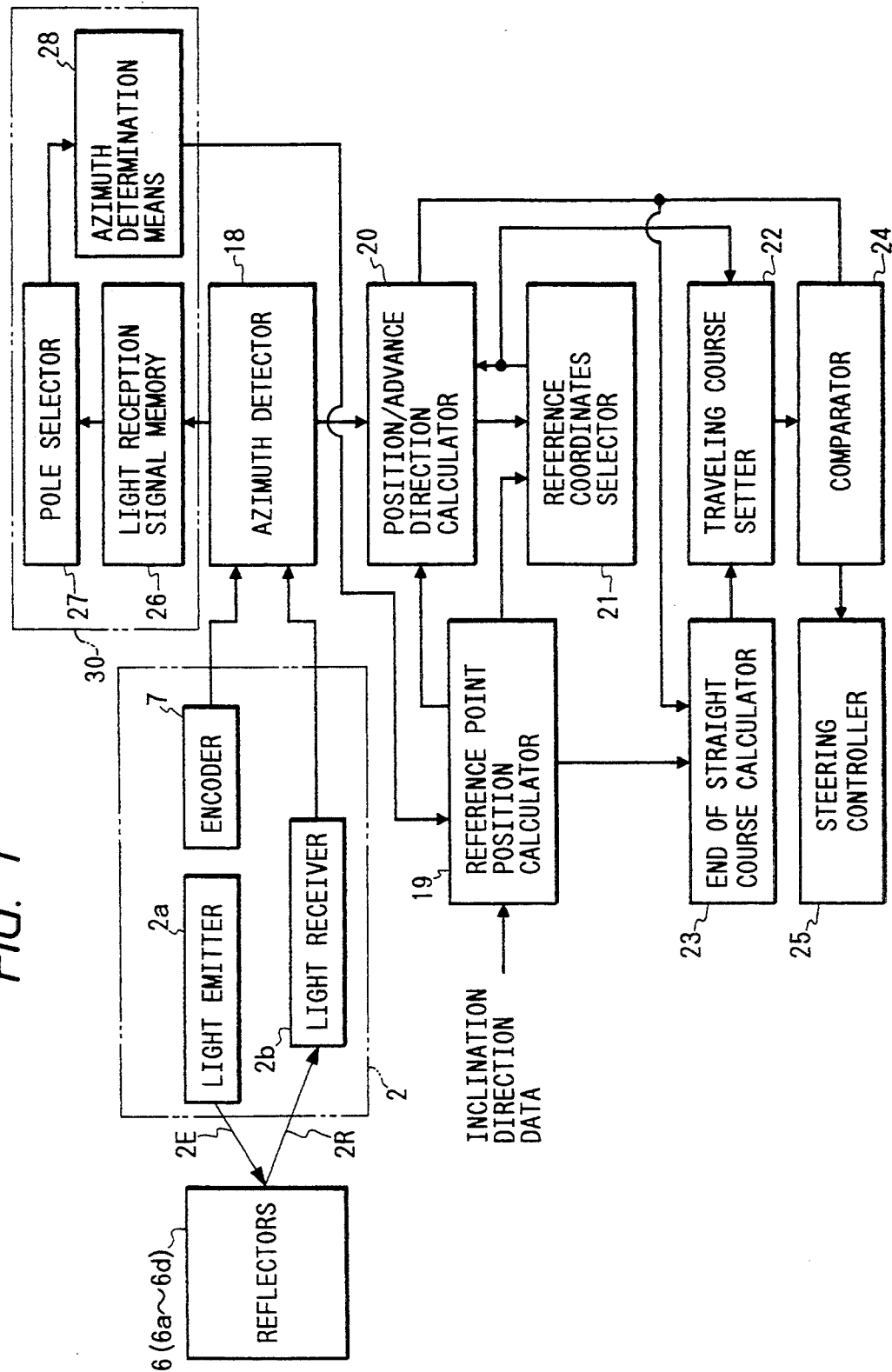
FIG. 1 is a functional block diagram of the main portions of the control system showing an embodiment of the present invention.

Now, the main functions of the control system for performing the above stated operation is described with reference to the functional block diagram of FIG. 1. In that figure, light beam 2E output from light emitter 2a of scanner 2 is reflected by reflector 6 (reflectors 6a–6d), and the reflected light 2R is detected at light receiver 2b. Encoder 7 generates a pulse signal according to the rotation amount of the mirrol 4 (FIG. 2).

In azimuth detector 18, the azimuth of each reflector 6a–6d viewed from moving vehicle 1 is detected on the basis of the detected direction of reflected light 2E. Input to the azimuth detector 18 are the light reception signal detected by light receiver 2b and the pulse signal from encoder 7. Azimuth detector 18 has a counter function of counting the pulse signal of encoder 7, and calculates the azimuth of each reflector 6a–6d on the basis of the count value of the pulse signal each time a light reception signal is input from light receiver 2b.

When the light beam scanning is initiated, it is not possible to identify the correspondence of the reference points in the traveling course calculation program and reflectors 6a–6d in the azimuths detected at azimuth detector 18 in the work site, and thus a process for assigning the detected azimuths to particular reference points is performed in initial pole processor 30. In light reception signal memory 26, light reception data (=azimuths) detected in azimuth detector 18 are stored for each detection block in the manner mentioned above. In pole selector 27, of the detection blocks stored in light reception signal memory 26, four azimuths are extracted in ascending order which azimuths represent the respective detection blocks. In azimuth determination means 28, the extracted azimuths are applied to the respective azimuths $\theta(1)$- $\theta(4)$ according to the process shown in the flowchart of FIG. 13, thereby to assign the extracted azimuths to the reference points.

In reference point position calculator 19, a reference point position is calculated according to the azimuths and distances of the reference points, as described with reference to steps S2 and S3 of FIG. 7A. For calculating the reference point position, the inclination direction data of the gimbal-type precession device indicated by a rotational angle which is detected by a sensor (not shown) coupled to the motor 15, and the light signal received by the light receiver 2a are input to reference point position calculator 19.

In position and advance direction calculator 20, the position and advance direction of moving vehicle 1 are calculated on the basis of the data supplied from azimuth detector 18 and reference point position calculator 19. In reference coordinates selector 21, on the basis of the positional data on the reference points provided by reference point position calculator 19, and the position $(Xp, Yp)$ and advance direction $\theta f$ of the moving vehicle 1 provided by position and advance direction calculator 20, the deviation angles $\phi(n)$ of the advance direction $\theta f$ relative to x-coordinate axis are calculated for the reference coordinates (1) to (4), respectively, thereby to select one reference coordinates as mentioned above. The coordinates determination signal which is output in connection with the reference coordinates determination is input to traveling course setter 22 and position/advance direction calculator 20. In response to the determination signal, the end coordinate Xend in the x-axis direction of the straight courses is revised in traveling course setter 22. That is, as the Xend, a position which is nearer the origin by a predetermined value than the x-coordinate of the reference point having the largest x-coordinate in the selected reference coordinates, for instance, a coordinate value which is smaller by half of the width of moving vehicle 1 is set. Also, in position/advance direction calculator 20, the subsequent calculations are performed according to the reference coordinates selected by the reference coordinates determination signal.

The end of straight course calculator 23 calculates end coordinates of each straight course on the basis of the x-coordinate value of the vehicle 1 and the coordinates of the reference points A to D which are supplied from the position/advance direction calculator 20 and the reference position calculator 19, respectively. The calculated end coordinates are supplied to the traveling course setter 22.

Comparator 24 detects the deviation between the traveling course coordinates provided from traveling course setter 22 and the current position and advance direction data of moving vehicle 1 provided from positionadvance direction calculator 20, and outputs it to steering controller 25. Based on the comparison result in comparator 24, steering controller 25 drives the steering wheel of moving vehicle 1 with a steering motor (not shown), thereby to adjust the traveling direction of moving vehicle 1 so that the deviation decreases.

In the above embodiment, an example is shown in which one of the outlining straight lines connecting the individual refelcence points, that is intersected by a virtual line extending in the direction of 180° with respect to the advance direction moving vehicle 1 placed in the work area, is used as a reference line, and a traveling course is set on lines perpendicular to the reference line acting as the x-axis. Alternatively, it is possible that the outlining straight line, which forms the smallest angle with the advance direction of the moving vehicle 1 placed in the work area, is selected as tile y-axis, and a traveling course is set so that straight courses are parallel with the y-axis.

In the latter case, one of the outlining straight lines connecting the individual reference points, that is intersected by a virtual line extended in the direction of 90° with respect to the advance direction of moving vehicle 1 initially placed in the work area, is used as a base line, and the azimuths of all the four reference points are determined according to a replacement criterion that the first reference point forming an azimuth of 90° or greater with the advance direction is recognized to be the reference point expected to be detected secondly in the traveling course calculation program. Then a traveling path is set which consists of a plurality of straight courses approximately parallel with the reference line, and transfer courses for moving from one to the other of the straight courses.

Figures 8, 9:
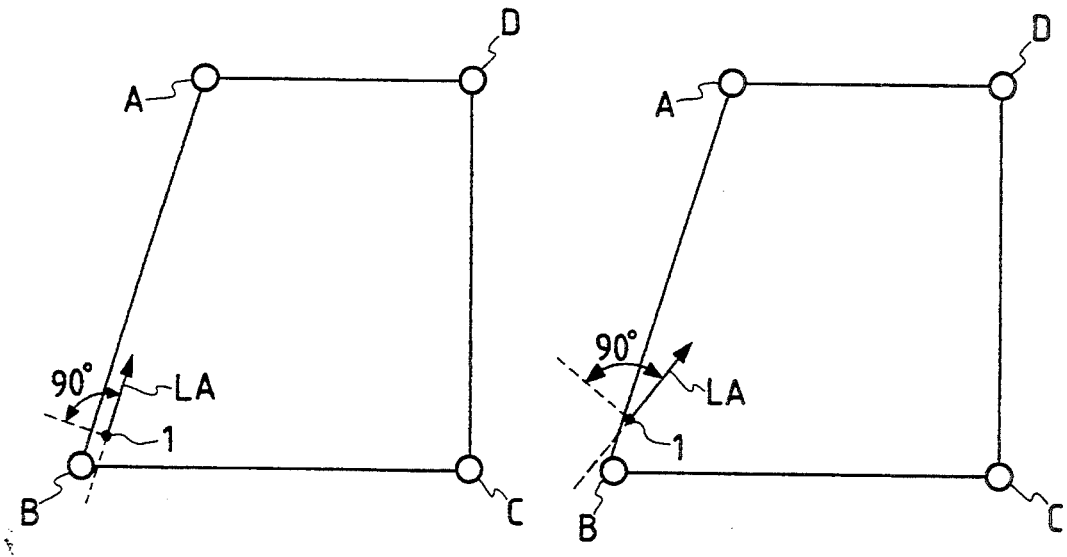
FIGS. 8 and 9 are illustrations showing a concept of the reference points decision method in the second embodiment of the present invention, respectively.

The reason for taking the above method of determining the azimuths of the reference point is as follows. FIGS. 8 and 9 illustrate the method of determining the azimuth of each reference point when the moving vehicle 1 is to travel on straight courses set in parallel with the reference line.

If the moving vehicle 1 is to travel a straight course parallel with the reference line (line AB), usually the moving vehicle 1 is initially placed along line AB decided to be the reference line and near reference point B as shown in FIG. 8. However, exceptionally it may be initially placed diagonally to the reference line AB as shown in FIG. 9.

If a light beam is rotatively scanned in a counterclockwise direction based on the advance direction of the vehicle, the first reference point for which the detected azimuth exceeds 180° is reference point C in FIG. 8 whereas it is reference point B in FIG. 9. Both are not in coincidence. However, if the first reference point for which the detected azimuth exceeds 90° is specified as the reference point expected to be detected secondly, reference point B is the one expected to be detected secondly in both cases of FIGS. 8 and 9.

In this embodiment, a special light tieam scanning locus is drawn by a gimbal-type precession mechanism to enable a light beam to surely be applied to reference points A-D. The control in connection with the operation of the gimbal-type mechanism is described in Japanese Patent Applicatien Nos. 3-126511 and 3-230833 and is not directly pertinent to the present invention, and thus it is omitted from the description herein.

It will be easily understood that the present invention may also be implemented as in this embodiment for a system which carries no gimbal-type precession mechanism, namely, a system in which the light beam scanning plane is unchanged.

As obvious from the above description, in accordance with the present invention, it is not required to pay special attention to the direction in which the moving vehicle is placed at the start of a work depending on the arrangement of the reference points, or the work area shape. Even if the operator just places the moving vehicle at a work start position with his rough feeling, a traveling course enabling the work to be performed efficiently is automatically setected and set according to the work area shape. Also, the actual reference point detection sequence can be set so as to corrrespond to a detection sequence previously assumed in the traveling course calculation program. The setting of the moving vehicle at the work start position or the preparation procedure before the work start is simplified and easily automatizod in the present invention.

What is claimed is:

1. A steering control system for a vehicle that is movable through a work area to perform a work operation, said control system comprising light beam scanner means mounted on the vehicle for rotatively scanning a light beam in a predetermined direction around the vehicle, light receiver means mounted on said vehicle for detecting light beams reflected from light reflector means, said light reflector means being placed at at least four positional reference points disposed at positions spaced from said vehicle so as to surround the work area and for reflecting light in its direction of incidence, azimuth detector means for detecting the azimuth of each reference point relative to said vehicle prior to the start of the work operation on the basis of a detection signal resulting from the light reflected at said each reference point, a memory having stored therein an algorithm for calculating a traveling course for the vehicle relative to said positional reference points, said algorithm including reference points, said algorithm including reference points, means for assigning each positional reference point detected by said azimuth detector means to a respective reference point in said algorithm, said assigment being based on detection of a positional reference point that is firstly detected under the condition that it azimuth exceeds a first predetermined angle when the azimuth is measured with respect to the advance direction of the vehicle initially placed in the traveling area before the start of a work, said assigning means also determining which of said positional reference points should be the origin of a coordinate system and designating the coordinate axes of said coordinate system on which said traveling course is to be set, means for setting a traveling course for said vehicle according to said algorithm using positional information of the assigned positional reference points, means for initiating movement of said vehicle after said traveling course has been set, and means for controlling a steering mechanism of said vehicle to cause said vehicle to move through said work area along said traveling course.

2. The system of claim 1 wherein the traveling course set by said traveling course setting means comprises a plurality of spaced substantially straight courses each of which forms a second predetermined angle on said coordinate system relative to a particular outlining straight line of said work area, said particular outlining straight line being one of a plurality of outlining straight lines that sequentially interconnect adjacent ones of said positional reference points so as to surround the work area, said particular outlining straight line being intersected by a virtual line extended in the direction forming said first predetermined angle relative to said advance direction.

3. The system of claim 2 wherein said second predetermined angle is approximately 180°.

4. The system of claim 2 wherein said second predetermined angle is approximately 90°.

5. The system of claim 2 wherein said substantially straight courses are parallel to each other, adjacent ones of said straight courses being interconnected at one of their ends by a transfer course to form a single contimous traveling course.

6. The system of claim 2 wherein said light beam scanner means includes means for vertically oscillating said light beam, said system further comprising:

means storing the azimuths of light beams detected by said light receiver means during the light beam scanning by said light beam scanner means prior to the traveling of said moving vehicle, and storing the number of said detected light beams that are in substantially the same azimuth, means for sorting said stored azimuths in order of magnitude, and means for registering said same azimuth as the azimuth of one of said light reflector means viewed from said moving vehicle when the number of said light beams detected in substantially said same azimuth has reached a predetermined number.

7. The system of clain 6 wherein said light beam scanner means causes said scanned light beam to be rotatively scanned a plurality of times during one vertical oscillation cycle.

8. The system of claim 1 wherein said first predetermined angle is approximately 90° and said assigning means assigns said firstly detected positional reference point to a second reference point in said algorithm.

9. The system of claim 1 wherein said first predetermined angle is approximately 180° and said assigning means assigns said firstly detected positional reference point to a third reference point in said algorithm.

* * * * *